(12) United States Patent
Wei et al.

(10) Patent No.: US 10,763,039 B2
(45) Date of Patent: Sep. 1, 2020

(54) INDUCTOR WINDING METHOD AND INDUCTOR WINDING DEVICE

(71) Applicant: Vertiv Tech Co., Ltd., Shenzhen (CN)

(72) Inventors: Yunfeng Wei, Guangdong (CN); Yaming Shi, Guangdong (CN); Fubin Xu, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 453 days.

(21) Appl. No.: 15/420,869

(22) Filed: Jan. 31, 2017

(65) Prior Publication Data

US 2017/0250025 A1    Aug. 31, 2017

(30) Foreign Application Priority Data

Feb. 26, 2016  (CN) .......................... 2016 1 0109545

(51) Int. Cl.
 H01F 41/06    (2016.01)
 H01F 41/069   (2016.01)
 (Continued)

(52) U.S. Cl.
 CPC ........... H01F 41/069 (2016.01); H01F 27/38 (2013.01); H01F 37/00 (2013.01); H01F 38/08 (2013.01);
 (Continued)

(58) Field of Classification Search
 CPC ........ H01F 41/24; H01F 41/28; H01F 41/069; H01F 27/2823; H01F 27/24; H01F 27/28;
 (Continued)

(56) References Cited

U.S. PATENT DOCUMENTS 3,413,580 A * 11/1968 Gibas ....................... H01F 7/08
 335/279
5,422,619 A    6/1995 Yamaguchi et al.
 (Continued)

FOREIGN PATENT DOCUMENTS

CN   202159981 U    3/2012
CN   202816585 U    3/2013
 (Continued)

OTHER PUBLICATIONS

Office Action regarding Chinese Patent Application No. 201610109545.5, dated Apr. 3, 2018. Translation provided by Unitalen Attorneys at Law.
 (Continued)

*Primary Examiner* — Peter Dungba Vo
*Assistant Examiner* — Kaying Kue
(74) *Attorney, Agent, or Firm* — Harness, Dickey & Pierce, P.L.C.

(57) ABSTRACT

Provided is an inductor winding method and an inductor winding device. The inductor winding method comprises steps of: A. dividing turns of coil of each winding of the inductor into a first winding and a second winding based on a preset ratio; B. winding the first winding on one of multiple magnetic columns, and winding the second winding on another one of the multiple magnetic columns which is different from the magnetic column on which the first winding is wound; and C. performing step A and step B cyclically until all the windings of the inductor are wound. With a coupling inductor having interleaving-wound structure, power frequency magnetic fluxes generated by magnetic lines in magnetic columns counteract one another, thereby solving the problem of high magnetic flux density in a magnetic core while achieving certain leakage inductance.

7 Claims, 11 Drawing Sheets

(51) Int. Cl.
  *H01F 27/38* (2006.01)
  *H01F 37/00* (2006.01)
  *H01F 38/08* (2006.01)
  *H01F 27/30* (2006.01)
  *H01F 38/02* (2006.01)
  *H02M 3/158* (2006.01)
  *H02M 1/14* (2006.01)
  *H02M 1/00* (2006.01)

(52) U.S. Cl.
  CPC ...... *H01F 27/306* (2013.01); *H01F 2038/026* (2013.01); *H02M 1/14* (2013.01); *H02M 3/1584* (2013.01); *H02M 2001/0064* (2013.01)

(58) Field of Classification Search
  CPC ........ H01F 27/38; H01F 27/306; H01F 37/00; H01F 38/08; H01F 2038/026; Y10T 29/49071; Y10T 29/4902; Y10T 29/49075; H02M 3/1584; H02M 1/14; H02M 2001/0064
  USPC ................ 29/602.1, 605, 607, 603.01–609.1
  See application file for complete search history.

(56) References Cited

U.S. PATENT DOCUMENTS

| | | | | |
|---|---|---|---|---|
| 6,339,265 | B1* | 1/2002 | Levin | H02J 3/01 307/105 |
| 6,348,848 | B1 | 2/2002 | Herbert | |
| 7,332,992 | B2* | 2/2008 | Iwai | H01F 27/255 336/170 |
| 7,834,726 | B2 | 11/2010 | Ushijima | |
| 9,959,972 | B2* | 5/2018 | Lestoquoy | H01F 27/38 |
| 10,199,160 | B2* | 2/2019 | Lestoquoy | H01F 27/38 |
| 2004/0155596 | A1* | 8/2004 | Ushijima | H05B 41/2822 315/224 |
| 2007/0258273 | A1 | 11/2007 | Engelage | |
| 2014/0043127 | A1* | 2/2014 | Worek | H01F 27/38 336/178 |
| 2014/0268896 | A1 | 9/2014 | Kurita et al. | |
| 2016/0254756 | A1* | 9/2016 | Yang | H01F 30/12 363/21.02 |
| 2017/0076850 | A1 | 3/2017 | Liu et al. | |

FOREIGN PATENT DOCUMENTS

| | | |
|---|---|---|
| CN | 203312005 U | 11/2013 |
| CN | 103500633 A | 1/2014 |
| CN | 103871716 A | 6/2014 |
| CN | 104021920 A | 9/2014 |
| CN | 205039063 U | 2/2016 |
| EP | 2905789 A1 | 8/2015 |
| JP | H11273975 A | 10/1999 |
| WO | WO-2009038336 A2 | 3/2009 |
| WO | WO-2015180417 A1 | 12/2015 |

OTHER PUBLICATIONS

Extended European Search Report regarding Application No. 17156634.2 dated Jul. 25, 2017.

Second Chinese Office Action regarding Chinese Patent Application No. 201610109545.5 dated Nov. 28, 2018. English translation provided by Unitalen Attorneys at Law.

* cited by examiner

INDUCTOR WINDING METHOD AND INDUCTOR WINDING DEVICE

CROSS-REFERENCE TO RELATED APPLICATIONS

This application claims the benefit and priority of Chinese Application No. 2016101 09545.5, filed on Feb. 26, 2016, the entire disclosure of which is incorporated herein by reference.

TECHNICAL FIELD

The present disclosure generally relates to the technical field of inductor, and in particular to an inductor winding method and an inductor winding device.

BACKGROUND

An interleaved parallel connected power converter can improve efficiency and power density while cancel current ripple and improve input or output characteristics. Therefore, the interleaved parallel connected power converter is widely applied in power factor correction circuits, inverter circuits and direct-current (DC) converting circuits. A typical two-phase interleaved circuit is shown in FIG. 1, where each phase of the circuit includes a separate filter inductor, denoted as L1 and L2 respectively. A dedicated control loop needs to be designed in the interleaved parallel connected converter to achieve current sharing between the inductors for the respective phases.

A multi-state switching circuit is a new type of circuit developed based on the interleaved parallel connection structure. A typical three-state switching circuit is shown in FIG. 2. The circuit has a structure similar to the interleaved parallel connection structure, except for two phases sharing one coupling inductor, and a separate inductor, i.e. inductor L in FIG. 2, is further arranged between the coupling inductor and the input (or the output). Current sharing between the interleaved parallel connected circuits can be achieved by providing the coupling inductor.

In the three-state switching circuit shown in FIG. 2, different combinations of ON states of four switching transistors form three equivalent operation states, including a state in which an upper transistor and a lower transistor are ON simultaneously, a state in which two upper transistors are ON simultaneously, and a state in which two lower upper transistors are ON simultaneously, based on which the three-state switch is named. As compared with the interleaved parallel connection structure, current sharing can be achieved automatically between the circuits for respective phases without current sharing control due to the presence of an auto-transformer, thus a current sampling circuit is not needed. In addition, the filtering inductor L and the coupling inductor may be optimized independently based on working conditions thereof, in order to improve converting efficiency. Besides, according to power requirement, the three-state circuit may be extended to a multi-state circuit such as a typical four-state switching circuit shown in FIG. 3.

In order to further improve power density and overall efficiency, the inductor L in FIG. 3 may be replaced with a leakage inductance of the coupling inductor $L_{coupling}$. In this way, an inductor element can be eliminated, and the new component is referred to as "coupling inductor with integrated inductor L". FIG. 4 shows a cross-sectional view of a structure of a typical four-state coupling inductor with integrated inductor L. The structure includes a magnetic core including three magnetic columns for three phases, and three windings of the coupling inductor, i.e., a winding A, winding B and winding C, which are respectively wound on the three magnetic columns.

Current waveforms in respective windings of the coupling inductor in the multi-state switching circuit include a power frequency current and a high frequency ripple current superimposed thereon. And magnitudes and phases of the power frequency currents in respective windings are the same. Therefore, magnitudes and phases of power frequency magnetic fluxes generated by respective inductors in the respective magnetic columns are the same. As shown by the magnetic lines represented by dashed lines between the magnetic columns in FIG. 4, the magnetic lines generated by each of the three inductors counteract the magnetic lines generated by other inductors after flowing through the other two magnetic columns. In theory the power frequency magnetic fluxes of the three windings counteract one another completely. However, since magnetic paths for the three magnetic cores have different lengths, the magnetic fluxes generated by the power frequency currents in the three windings cannot counteract one another completely. The power frequency magnetic flux is similar to a DC bias with respect to high frequency current, and may cause saturation of the magnetic core. In order to prevent the saturation, a large air gap is needed in the magnetic core. In this case, an inductor loss is increased, which is disadvantageous for efficiency optimization.

SUMMARY OF INVENTION

The present disclosure provides an inductor winding method and an inductor winding device, to address a technical problem in the conventional technology that, magnetic fluxes generated by power frequency currents in three windings cannot counteract one another completely, thereby causing the saturation of the magnetic core, increasing the inductor loss, which is disadvantageous for efficiency optimization.

The present disclosure addresses such technical problem with the following technical solutions.

An inductor winding method is provided, wherein a magnetic core comprising a plurality of magnetic columns and an inductor comprising a plurality of windings are provided, and the method comprises the steps of:

A. dividing turns of coil of each winding of the inductor into a first winding and a second winding based on a preset ratio;

B. winding the first winding on one of the plurality of magnetic columns, and winding the second winding on another one of the plurality of magnetic columns which is different from the magnetic column on which the first winding is wound; and C. performing step A and step B cyclically until all the windings of the inductor are wound.

In the inductor winding method according to the disclosure, in step B, magnetic lines generated by two windings on the same magnetic column may have opposite directions.

In another aspect, an inductor winding device is provided, wherein the inductor winding device comprises:

a magnetic core comprising a plurality of magnetic columns; and an inductor comprising a plurality of windings, wherein turns of coil of each winding of the inductor is divided into a first winding and a second winding based on a preset ratio, the first winding is wound on one of the plurality of magnetic columns and the second winding is wound on another one of the plurality of magnetic columns which is different from the magnetic column on which the first winding is wound.

In the inductor winding device according to the disclosure, magnetic lines generated by two windings on the same magnetic column may have opposite directions.

In the inductor winding device according to the disclosure, the magnetic core may further comprise an upper yoke and a lower yoke, where the plurality of magnetic columns are arranged between the upper yoke and the lower yoke.

In the inductor winding device according to the disclosure, the magnetic core may further comprise a secondary magnetic core connected to the upper yoke and the lower yoke.

In the inductor winding device according to the disclosure, the secondary magnetic core may comprises a plurality of secondary sub-magnetic cores corresponding to the plurality of magnetic columns, wherein the plurality of secondary sub-magnetic cores are connected at the same side of the upper yoke and the lower yoke.

In the inductor winding device according to the disclosure, the secondary magnetic core may comprise a plurality of secondary sub-magnetic cores, wherein the plurality of secondary sub-magnetic cores are arranged between the upper yoke and the lower yoke, and are arranged alternately with the plurality of magnetic columns.

In the inductor winding device according to the disclosure, the secondary magnetic core may comprise two secondary sub-magnetic cores, wherein
- the two secondary sub-magnetic cores are respectively connected to a front side and a back side of the upper yoke and the lower yoke; or
- the two secondary sub-magnetic cores are respectively connected to a left side and a right side of the upper yoke and the lower yoke; or
- the two secondary sub-magnetic cores are arranged between the upper yoke and the lower yoke.

In the inductor winding device according to the disclosure, wherein the secondary magnetic core may be a cylinder, and both the upper yoke and the lower yoke may be cylinders, wherein a diameter of a bottom surface of the secondary magnetic core is smaller than a diameter of a bottom surface of the upper yoke or a diameter of a bottom surface of the lower yoke; and
- the secondary magnetic core is arranged between the upper yoke and the lower yoke, wherein a center of the bottom surface of the secondary magnetic core coincides with both a center of the bottom surface of the upper yoke and a center of the bottom surface of the lower yoke.

The winding method and winding device for inductor disclosed in the above have the following advantages. With a coupling inductor having an interleaving-wound structure, power frequency magnetic fluxes generated by magnetic lines in magnetic columns counteract one another, thereby solving the problem of high magnetic flux density in a magnetic core while achieving certain leakage inductance. In addition, coupling coefficients between the windings of the coupling inductor are increased and power frequency magnetic flux density is reduced.

DETAILED DESCRIPTION OF EMBODIMENTS

To make the objects, technical solutions and advantages of the present disclosure clearer, the present disclosure is illustrated in detail in conjunction with the drawings and embodiments hereinafter. It should be understood that, the embodiments described herein are only for illustrating the present disclosure, and are not intended to limit the present disclosure.

Figure 1:
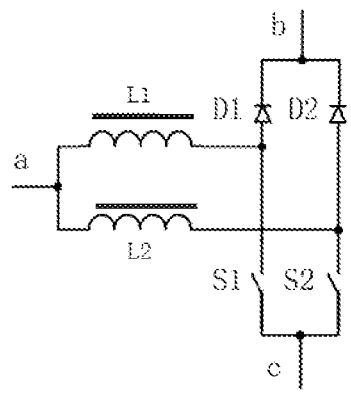
FIG. 1 is a diagram showing a two-phase interleaved circuit according to the conventional technology.
Figure 2:
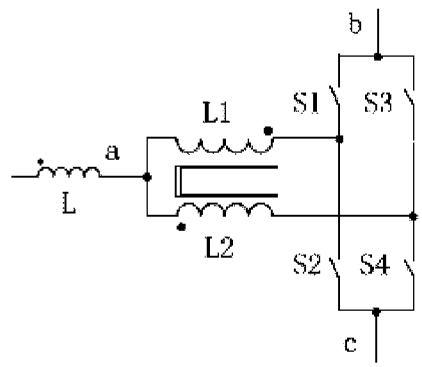
FIG. 2 is a diagram showing a three-state switching circuit according to the conventional technology.
Figure 3:
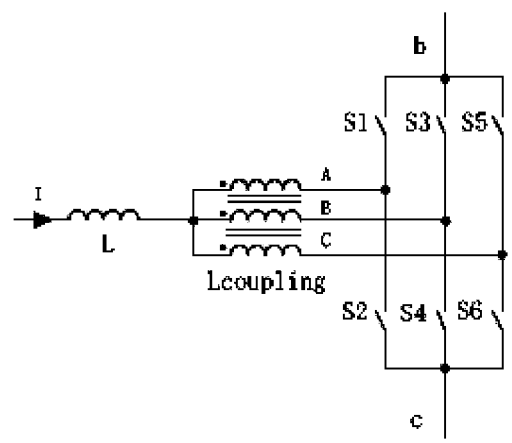
FIG. 3 is a diagram showing a four-state switching circuit according to the conventional technology.
Figure 4:
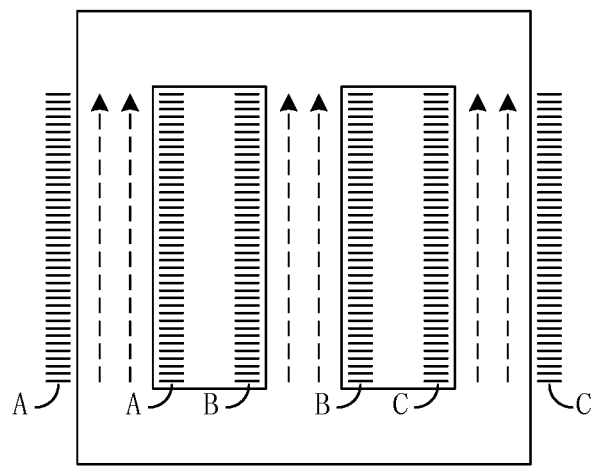
FIG. 4 is a schematic diagram illustrating winding manner of a four-state coupling inductor with integrated inductor in the four-state switching circuit according to the conventional technology.

The present disclosure provides an inductor winding method and an inductor winding device, to address the problem regarding saturation of the magnetic core caused by power frequency magnetic flux of a four-state coupling inductor with integrated inductor in a four-state switching circuit shown in FIG. 4. In the present disclosure, by means of a coupling inductor with interleaving-wound structure, power frequency magnetic fluxes generated by magnetic lines in respective magnetic columns counteract one another, thereby addressing the problem of high magnetic flux density in the magnetic core, achieving certain leakage inductance, increasing coupling coefficients among respective coupling inductor windings and reducing a power frequency magnetic flux density.

It should be noted that, items such as "front", "back", "left", "right" and similar representations herein are only for illustration, and are not intended to define specific directions. Unless defined otherwise, all technical and scientific terms used herein have same meanings as commonly understood by those skilled in the art of the present disclosure. The terms used in the specification of the present disclosure herein are only for describing particular embodiments and are not intended to limit the present disclosure.

Figure 5:
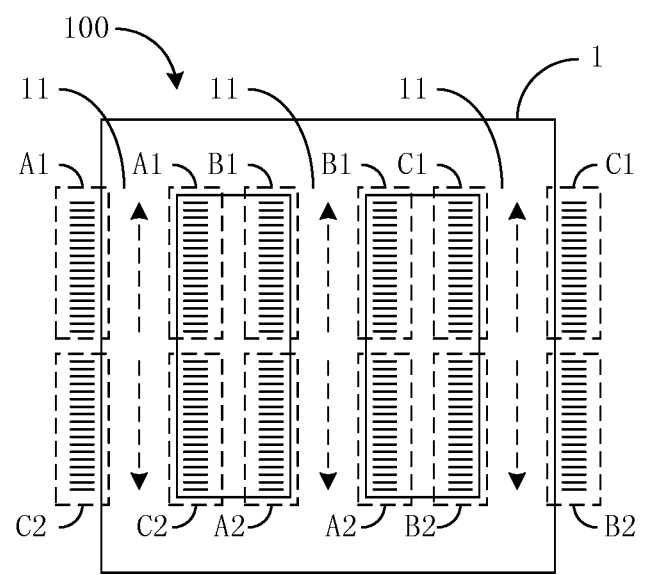
FIG. 5 is a schematic diagram illustrating winding manner of a four-state coupling inductor with integrated inductor in the four-state switching circuit according to the present disclosure.

FIG. 5 is a schematic diagram illustrating the winding manner of a four-state coupling inductor 2 with integrated inductor in the four-state switching circuit according to the present disclosure. The inductor 2 includes three windings A, B and C. Each of the windings is divided into two portions. For example, the winding A is divided into a winding A1 and a winding A2, the winding B is divided into a winding B1 and a winding B2, and the winding C is divided into a winding C1 and a winding C2.

Figure 6:
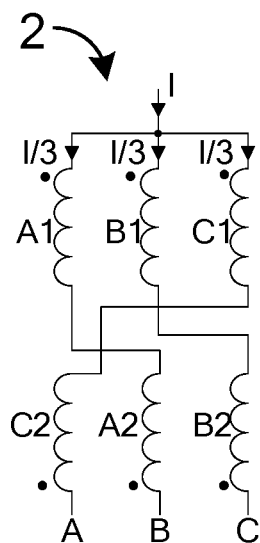
FIG. 6 is a wiring diagram for a four-state coupling inductor with integrated inductor in the four-state switching circuit according to the present disclosure.

The wiring manner for the inductor 2 is shown in FIG. 6. FIG. 6 is a wiring diagram for the four-state coupling inductor 2 with integrated inductor in the four-state switching circuit according to the present disclosure. In FIG. 6, the winding A1 and the winding C2 are wound on a same magnetic column 11. If the winding A1 is wound clockwise from top to bottom, the winding C2 is wound anticlockwise from top to bottom. The winding B1 and the winding A2, and the winding C1 and the winding B2 are wound in the same manner. Therefore, magnetic lines generated by two windings on the same magnetic column 11 have opposite directions.

Generally, in the coupling inductor 2 of the multi-state switching circuit, with such winding structure adopted, the coil turns wound on each magnetic column 11 are equally provided by two different windings, such as the winding A1 and the winding C2. Magnitudes and phases of power frequency currents in the two windings are the same. However, since one of the windings is wound reversely with respect to the other winding, power frequency magnetic fluxes generated by the winding A1 and the winding C2 in the magnetic column 11 on which the winding A1 and the winding C2 are wound have the opposite directions, as shown by magnetic lines represented by dashed lines in FIG. 5. Ideally, power frequency magnetic fluxes in the magnetic column 11 can counteract one another completely, thus the problem of high magnetic flux density in the magnetic core can be solved. Under the same condition, a value of a magnetic flux density in the magnetic core 1 of the inductor 2 wound in a conventional winding manner is 1.2 T, while the value of the magnetic flux density in the magnetic core 1 of the inductor 2 wound in the interleaving-winding manner as shown in FIG. 5 is 0.35 T.

Data in the following table also indicates that the coupling inductor 2 with the interleaving-wound structure achieves certain leakage inductance value, increases coupling coefficients among the respective coupling inductor 2 windings and reduces the power frequency magnetic flux density.

| winding manner | flux density of main magnetic core with low voltage and full load | coupling coefficient | self-inductance | leakage inductance |
| --- | --- | --- | --- | --- |
| separately winding | 1.2 T | 0.74 | 1.77 mH | 459.3 uH |
| interleaving-winding | 0.35 T | 0.925 | 1.3067 mH | 97.4 uH |

In the above table, the "separately winding" represents the winding manner shown in FIG. 4, and the "interleaving-winding" represents the winding manner shown in FIG. 5.

Figure 7A:
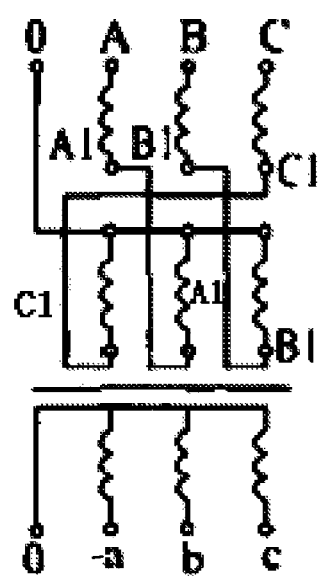
FIG. 7a is a schematic wiring diagram illustrating zigzag connection for a power transformer according to the conventional technology.
Figure 7B:
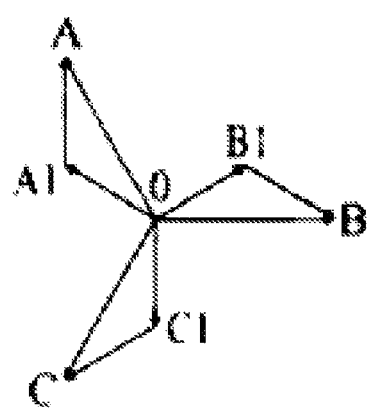
FIG. 7b is a current-phase schematic diagram for the power transformer according to the conventional technology.

In the conventional technology, a similar interleaving-winding manner is also applied in a power transformer, which is referred to as Z-connection or zigzag connection, as shown in FIG. 7. The zigzag connection is applied in a power transformer, which includes secondary windings which are isolated from primary windings. However, the present disclosure is applied to the coupling inductor 2, and the present disclosure includes only the primary windings which are coupled with one another without any secondary winding. According to the connection manner of the power transformer according to the conventional technology, a difference of 120 degrees exists between any two of three-phase power frequency currents in three primary windings (referring to FIG. 7b). In the present disclosure, no phase difference exists between power frequency currents in the respective windings of the coupling inductor 2 for the multi-state switch. That is, there is the same single-phase current with a high frequency ripple current superimposed thereon. The zigzag connection is adopted in the power transformer according to the conventional technology for reducing zero sequence impedance in order to improve lightning-proof performance and enhance a capability of bearing unbalance load. In the present disclosure, the coupling inductor 2 has the interleaving-wound structure to reduce the magnetic flux density in the magnetic column 11 under the premise of achieving certain leakage inductance.

In summary, the present disclosure aims to provide an inductor winding method and an inductor winding device. The inductor winding device 100 includes:
- a magnetic core 1, comprising a plurality of magnetic columns 11;
- an inductor 2, comprising a plurality of windings, wherein the coil turns of each winding of the inductor 2 is divided into a first winding and a second winding based on a preset ratio. The first winding is wound on one of the plurality of magnetic columns 11, and the second winding is wound on another one of the plurality of magnetic columns 11 which is different from the magnetic column on which the first winding is wound.

Accordingly, the inductor winding method is also referred to as interleaving-winding solution for windings. Based on the above magnetic core 1 including a plurality of magnetic columns 11 and the inductor 2 including a plurality of windings, the inductor winding method includes the following steps:
- A. dividing the coil turns of each winding of the inductor 2 into a first winding and a second winding based on a preset ratio;
- B. winding the first winding on one of the plurality of magnetic columns 11, and winding the second winding on another one of the plurality of magnetic columns 11 which is different from the magnetic column on which the first winding is wound.
- C. performing step A and step B cyclically, until all of the windings of the inductor 2 are wound.

Figure 8A:
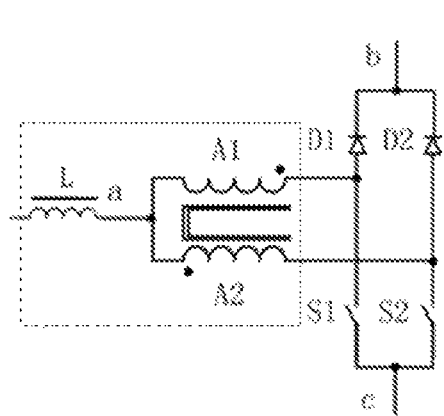
FIG. 8a is a schematic structural diagram of a first embodiment of a four-state coupling inductor with integrated inductor in the three-state switching circuit according to the present disclosure.
Figure 8B:
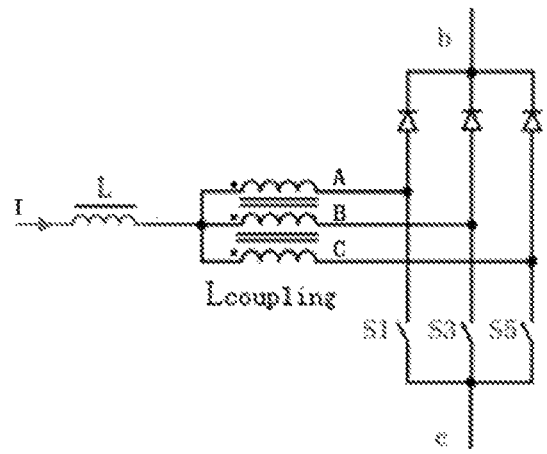
FIG. 8b is a schematic structural diagram of a second embodiment of a four-state coupling inductor with integrated inductor in the three-state switching circuit according to the present disclosure.

The above interleaving-winding solution for windings is described by taking the integrated coupling inductor 2 in the four-state switching circuit as an example, but is not limited to the four-state switching circuit. For example, the above interleaving-winding solution for windings is also applicable to an auto-transformer with integrated inductor in the three-state switching circuit as shown in FIGS. 8a and 8b and other multi-state switching circuits. FIG. 8a is a structural diagram of a first embodiment of the four-state coupling inductor with integrated inductor in the three-state switching circuit according to the present disclosure. And FIG. 8b is a structural diagram of a second embodiment of the four-state coupling inductor with integrated inductor in the three-state switching circuit according to the present disclosure.

Figure 9A:
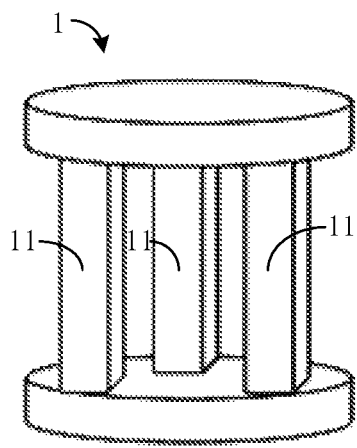
FIG. 9a is a schematic structural diagram of a delta-shaped three-column magnetic core according to the present disclosure.
Figure 9B:
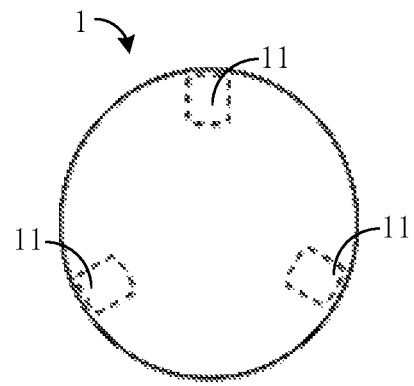
FIG. 9b is a top perspective view of the delta-shaped three-column magnetic core according to the present disclosure.

The magnetic core 1 on which the inductor 2 is wound may be a three-column magnetic core, as shown in FIGS. 9a and 9b. FIG. 9a is schematic structural diagram of a delta-shaped three-column magnetic core 1 according to the present disclosure. FIG. 9b is a top perspective view of the delta-shaped three-column magnetic core 1 according to the present disclosure. The three magnetic columns 11 are uniformly distributed on the circumferences of the upper cylinder surface and the lower cylinder surface.

In the above interleaving-winding solution for windings of the coupling inductor with integrated inductor in the multi-state switching circuit, the first winding is wound on one of the multiple magnetic columns 11, and the second winding is wound on another one of the multiple magnetic columns 11 which is different from the magnetic column on which the first winding is wound. These steps are performed cyclically until all windings of the inductor 2 are wound. The windings should be wound in the directions that make the magnetic lines generated by different windings on the same magnetic column 11 have opposite directions. Examples of the wiring manners meeting the above requirement are shown in FIGS. 10a to 10e. Wiring manners for the coupling inductor 2 of the multi-state switching circuit which are modified on the basis of such solutions are considered to be similar wiring manners.

Figure 10A:
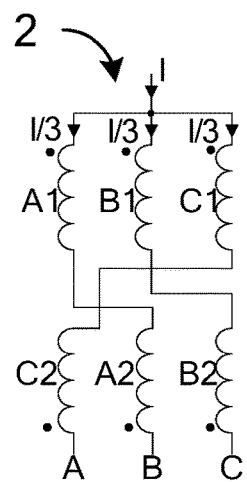
FIG. 10a is a schematic wiring diagram of a first embodiment of an interleaving-wound structure for an inductor according to the present disclosure.

FIG. 10a is a schematic wiring diagram of a first embodiment of an interleaving-wound structure for the inductor 2 according to the present disclosure. The winding A1 and the winding C2 are wound on the same magnetic column 11. If the winding A1 is wound clockwise from top to bottom, the winding C2 is wound anticlockwise from top to bottom. The winding B1 and the winding A2, and the winding C1 and the winding B2 are also wound in the same manner.

Figure 10B:
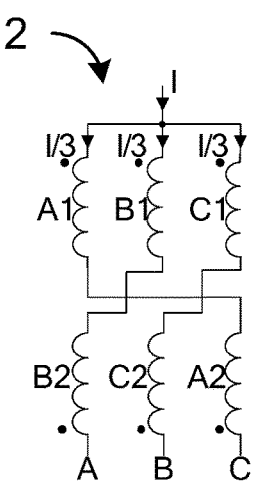
FIG. 10b is a schematic wiring diagram of a second embodiment of an interleaving-wound structure for the inductor according to the present disclosure.

FIG. 10b is a schematic wiring diagram of a second embodiment of an interleaving-wound structure for the inductor 2 according to the present disclosure. The winding A1 and the winding B2 are wound on the same magnetic column 11. If the winding A1 is wound clockwise from top to bottom, the winding B2 is wound anticlockwise from top to bottom. The winding B1 and the winding C2, and the winding C1 and the winding A2 are also wound in the same manner.

Figure 10C:
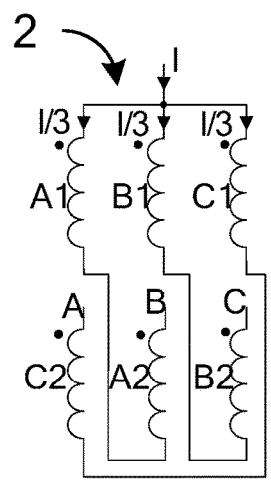
FIG. 10c is a schematic wiring diagram of a third embodiment of an interleaving-wound structure for the inductor according to the present disclosure.

FIG. 10c is a schematic wiring diagram of a third embodiment of an interleaving-wound structure for the inductor 2 according to the present disclosure. The winding A1 and the winding C2 are wound on the same magnetic column 11. If the winding A1 is wound clockwise from top to bottom, the winding C2 is wound clockwise from bottom to top. The winding B1 and the winding A2, and the winding C1 and the winding B2 are also wound in the same manner.

Figure 10D:
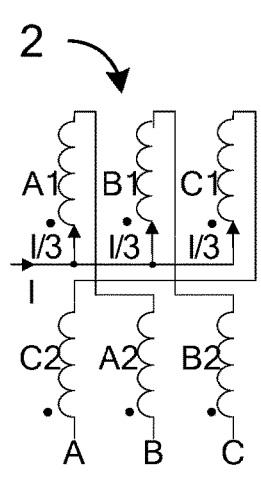
FIG. 10d is a schematic wiring diagram of a fourth embodiment of an interleaving-wound structure for the inductor according to the present disclosure.

FIG. 10d is a schematic wiring diagram of a fourth embodiment of an interleaving-wound structure for the inductor 2 according to the present disclosure. The winding A1 and the winding C2 are wound on the same magnetic column 11. If the winding A1 is wound anticlockwise from bottom to top, the winding C2 is wound anticlockwise from top to bottom. The winding B1 and the winding A2, and the winding C1 and the winding B2 are also wound in the same manner.

Figure 10E:
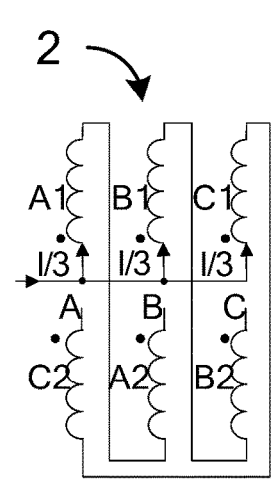
FIG. 10e is a schematic wiring diagram of a fifth embodiment of an interleaving-wound structure for the inductor according to the present disclosure.

FIG. 10e is a schematic wiring diagram of a fifth embodiment of an interleaving-wound structure for the inductor 2 according to the present disclosure. The winding A1 and the winding C2 are wound on the same magnetic column 11. If the winding A1 is wound anticlockwise from bottom to top, the winding C2 is wound clockwise from bottom to top. The winding B1 and the winding A2, and the winding C1 and the winding B2 are also wound in the same manner.

The above interleaving-winding solution for windings of the coupling inductor with integrated inductor in the multi-state switching circuit is described by taking three-column magnetic core as an example, but the number of the magnetic columns 11 is not limited to three. Such winding manner is applicable in a case that the magnetic core 1, for which the number of the magnetic columns 11 is greater than or equal to two, is applied to the integrated inductor in the multi-state switching circuit. In addition, in the above interleaving-winding solution for windings of the coupling inductor with integrated inductor in the multi-state switching circuit, the numbers of turns of different windings on each magnetic column 11 may be the same. Alternatively, the numbers of turns of different windings on each magnetic column 11 may be set to be different from each other depending on the required leakage inductance and magnetic flux density condition of the magnetic column 11.

In the interleaving-winding solution for windings, all the windings are wound on the magnetic columns 11. Alternatively, one or more secondary magnetic cores may be added in front of, at the back of, or on the left or right of each winding or of a certain single winding, or between two windings, so as to adjust the magnitude of the leakage inductance. The number of the secondary magnetic cores may be the same as or different from the number of the magnetic columns 11 of the main magnetic core. The secondary magnetic core may be made of the same material as or different material from the main magnetic core. The main magnetic core may be connected to the secondary magnetic core with magnetic core material, and an air gap may be provided between the main magnetic core and the secondary magnetic core.

Figure 11A:
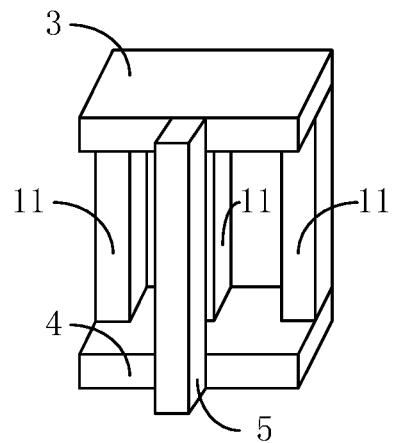
FIG. 11a is a perspective view of a first embodiment of an inductor winding device according to the present disclosure.
Figure 11B:
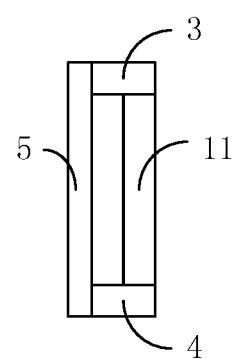
FIG. 11b is a side view of the first embodiment of the inductor winding device according to the present disclosure.

Referring to FIGS. 11*a* and 11*b*, FIG. 11*a* is a perspective view of a first embodiment of an inductor winding device 100 according to the present disclosure. FIG. 11*b* is a side view of the first embodiment of the inductor winding device 100 according to the present disclosure. In FIGS. 11*a* and 11*b*, an upper yoke 3 and a lower yoke 4 are provided, three magnetic columns 11 are uniformly arranged between the upper yoke 3 and the lower yoke 4, and a secondary magnetic core 5 is additionally provided in the middle of the same side of the upper yoke 3 and the lower yoke 4. The inductor 2 is not shown in FIG. 11*a* and FIG. 11*b*, and may be wound in any one of the manners shown in FIGS. 10*a* to 10*e*. The inductor 2 is not shown in the following FIGS. 12 to 18 either, which is not described hereinafter.

Figure 12:
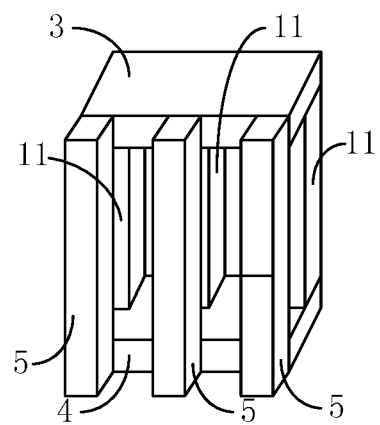
FIG. 12 is a perspective view of a second embodiment of an inductor winding device according to the present disclosure.

Referring to FIG. 12, FIG. 12 is a perspective view of a second embodiment of the inductor winding device 100 according to the present disclosure. This embodiment is different from the embodiment shown in FIGS. 11*a* and 11*b* by that, three secondary magnetic cores 5 are additionally provided, and are arranged at the same side of the upper yoke 3 and the lower yoke 4, respectively corresponding to the three magnetic columns 11.

Figure 13:
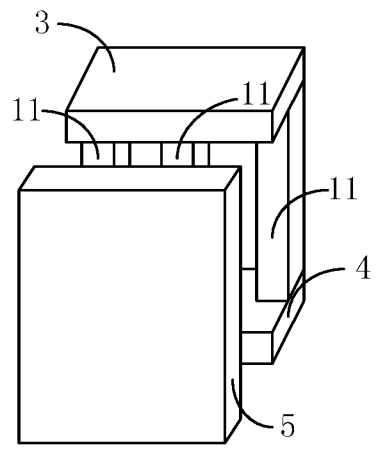
FIG. 13 is a schematic structural diagram of a third embodiment of an inductor winding device according to the present disclosure.

Referring to FIG. 13, FIG. 13 is a schematic structural diagram of a third device embodiment of the inductor winding device 100 according to the present disclosure. This embodiment is different from the embodiment shown in FIGS. 11*a* and 11*b* by that, the secondary magnetic core 5 is plate-shaped, and may cover the side surface at the same side of the upper yoke 3 and lower yoke 4.

Figure 14:
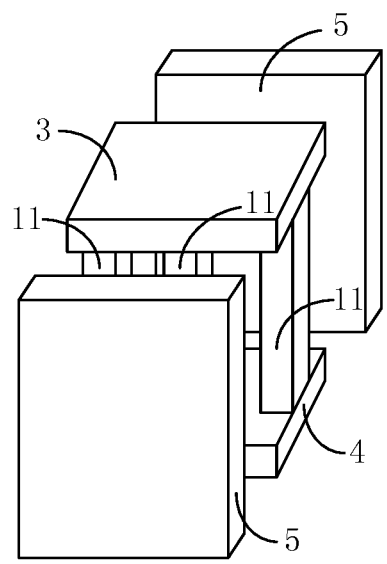
FIG. 14 is a schematic structural diagram of a fourth embodiment of an inductor winding device according to the present disclosure.

Referring to FIG. 14, FIG. 14 is a schematic structural diagram of a fourth device embodiment of the inductor winding device 100 according to the present disclosure. This embodiment is different from the embodiment shown in FIG. 13 by that, two plate-shaped secondary magnetic cores 5 are respectively arranged at two sides, i.e. the front side and the back side, of the three magnetic columns 11.

Figure 15A:
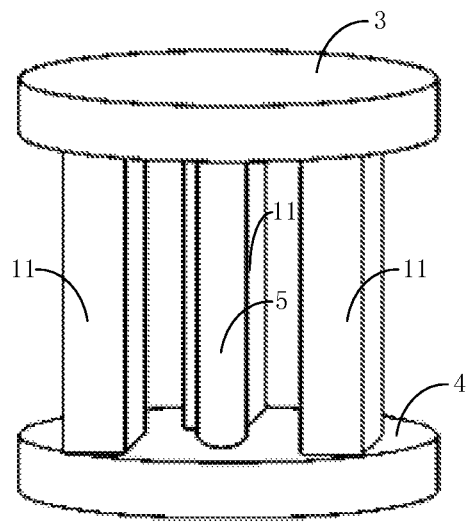
FIG. 15a is a perspective view of a fifth embodiment of an inductor winding device according to the present disclosure.
Figure 15B:
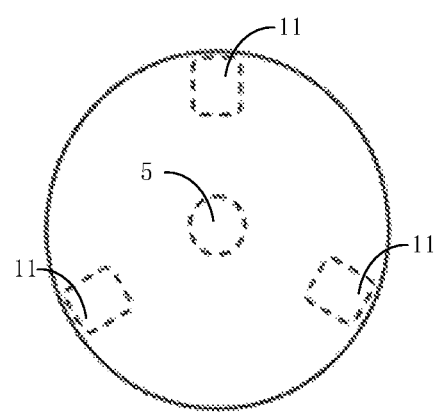
FIG. 15b is a top perspective view of the fifth embodiment of the inductor winding device according to the present disclosure.

Referring to FIGS. 15*a* and 15*b*. FIG. 15*a* is perspective view of a fifth device embodiment of the inductor winding device 100 according to the present disclosure, and FIG. 15*b* is a top perspective view of the fifth device embodiment of the inductor winding device 100 according to the present disclosure. In the fifth embodiment, the upper yoke 3 and the lower yoke 4 are cylinders of the identical shape, and three magnetic columns 11 are uniformly arranged on circumferences of the top cylinder surface and the bottom cylinder surface. The secondary magnetic core 5 is also a cylinder. A diameter of a bottom surface of the secondary magnetic core 5 is smaller than a diameter of a bottom surface of the upper yoke 3 or the lower yoke 4. The secondary magnetic core 5 is arranged between the upper yoke 3 and lower yoke 4, and a center of the bottom surface of the secondary magnetic core 5 coincides with a center of the bottom surface of the upper yoke 3 or the lower yoke 4.

Figure 16:
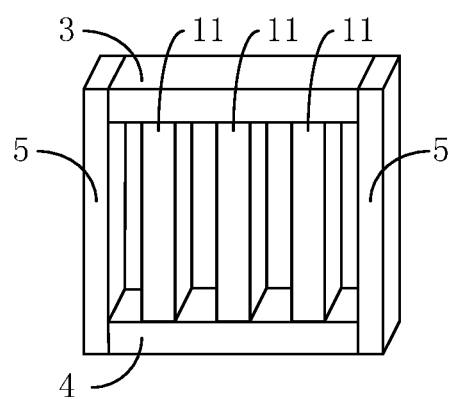
FIG. 16 is a schematic structural diagram of a sixth embodiment of an inductor winding device according to the present disclosure.

Referring to FIG. 16, FIG. 16 is a schematic structural diagram of a sixth device embodiment of the inductor winding device 100 according to the present disclosure. This embodiment is different from the embodiment shown in FIGS. 11*a* and 11*b* by that, the secondary magnetic core 5 includes two secondary sub-magnetic cores, which are respectively connected to a left side and a right side of the upper yoke 3 and the lower yoke 4.

Figure 17:
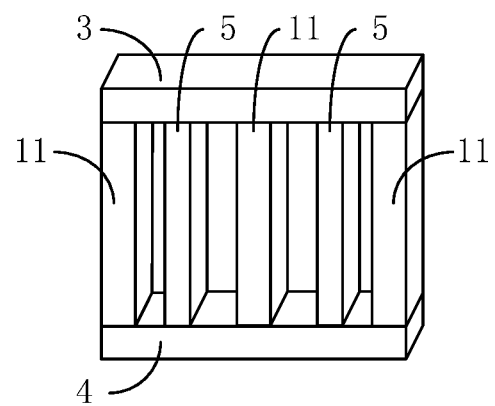
FIG. 17 is a schematic structural diagram of a seventh embodiment of an inductor winding device according to the present disclosure.

Referring to FIG. 17, FIG. 17 is a schematic structural diagram of a seventh device embodiment of the inductor winding device 100 according to the present disclosure. This embodiment is different from the embodiment shown in FIGS. 11*a* and 11*b* by that, the secondary magnetic core 5 includes two secondary sub-magnetic cores, which are arranged between the upper yoke 3 and lower yoke 4 and are arranged alternately with the three magnetic columns 11.

Figure 18:
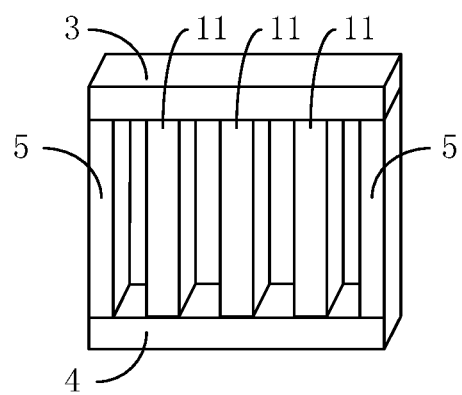
FIG. 18 is a schematic structural diagram of an eighth embodiment of an inductor winding device according to the present disclosure.

Referring to FIG. 18, FIG. 18 is a schematic structural diagram of an eighth device embodiment of the inductor winding device 100 according to the present disclosure. This embodiment is different from the embodiment shown in FIGS. 11*a* and 11*b* by that, the secondary magnetic core 5 includes two secondary sub-magnetic cores, which are arranged between the upper yoke 3 and lower yoke 4 and respectively arranged on a left side and a right side of the three magnetic columns 11.

Figure 19:
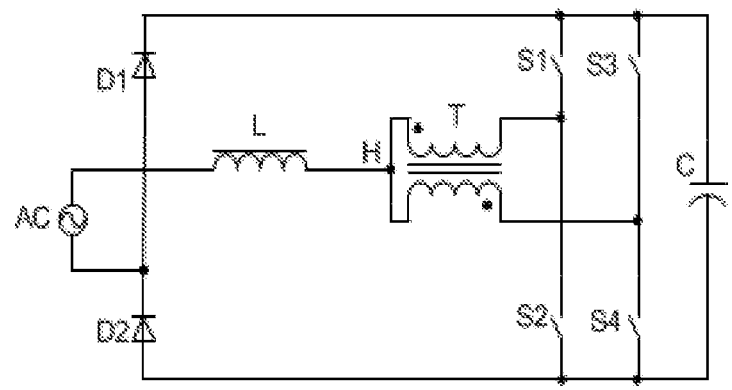
FIG. 19 is a circuit diagram of a rectifier according to the present disclosure.
Figure 20:
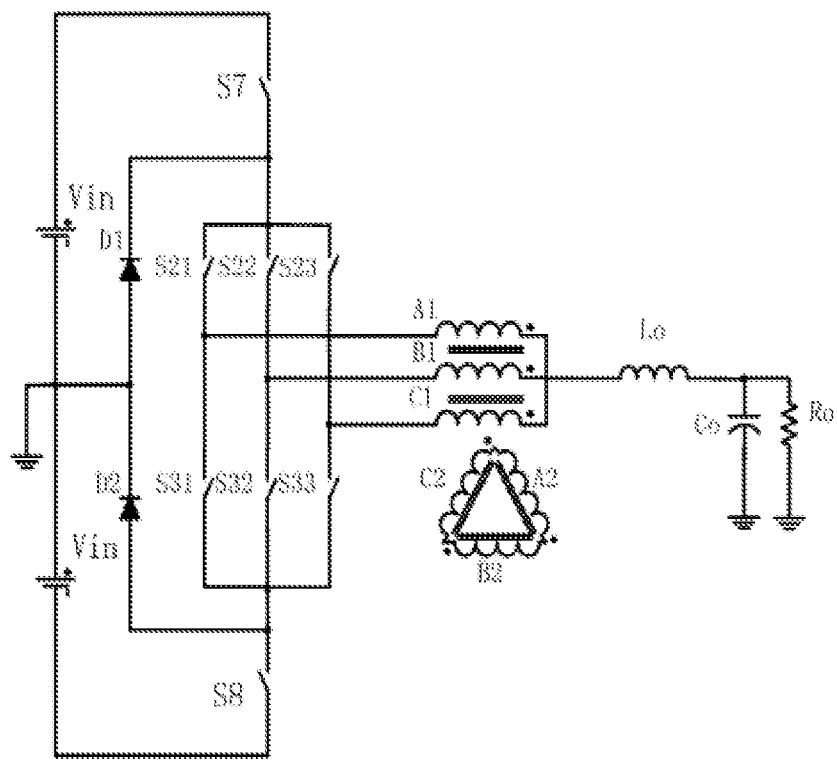
FIG. 20 is a circuit diagram of an inverter according to the present disclosure.
Figure 21:
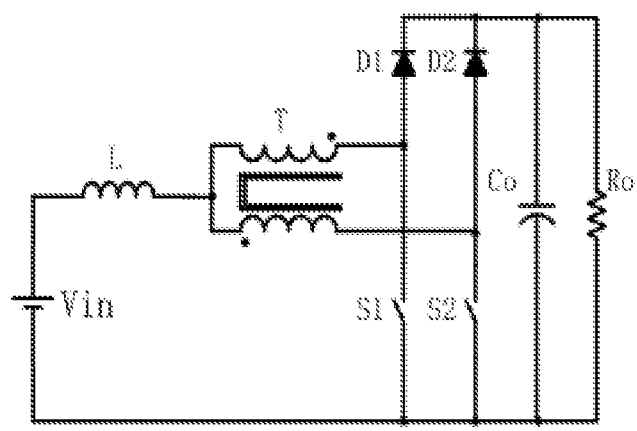
FIG. 21 is a circuit diagram of a direct-current converter according to the present disclosure.

Referring to FIGS. 19 to 21, FIG. 19 is a circuit diagram of a rectifier according to the present disclosure. FIG. 20 is a circuit diagram of an inverter according to the present disclosure. FIG. 21 is a circuit diagram of a direct-current converter according to the present disclosure. The interleaving-winding solution for windings for the multi-state switching may be applied in a rectifier topology, an inverter topology and the direct-current converter, and may have a two-level structure, a three-level structure and a higher level structure.

In the above, the embodiments of the present disclosure are described in conjunction with the drawings, and are not intended to limit the present disclosure. The above embodiments are only illustrative instead of limiting. Various forms can be made by those skilled in the art in light of the present disclosure without departing from the spirit of the present disclosure and the protection scope defined by the claims, and these forms all fall within the protection scope of the present disclosure.

The invention claimed is:

1. An inductor winding device, comprising:
   a magnetic core comprising a plurality of magnetic columns; and
   an inductor comprising a plurality of windings, wherein turns of coil of each winding of the inductor is divided into a first winding and a second winding based on a preset ratio, the first winding is wound on a first magnetic column of the plurality of magnetic columns and the second winding is wound on a second magnetic column of the plurality of magnetic columns which is different from the magnetic column on which the first winding is wound,
   wherein magnetic lines respectively generated by two windings on a same magnetic column of at least one of the first magnetic column and the second magnetic column, have opposite directions in an axis direction of the magnetic column.

2. The inductor winding device according to claim 1, wherein the magnetic core further comprises an upper yoke and a lower yoke, wherein the plurality of magnetic columns are arranged between the upper yoke and the lower yoke.

3. The inductor winding device according to claim 2, wherein the magnetic core further comprises a secondary magnetic core connected to the upper yoke and the lower yoke.

4. The inductor winding device according to claim 3, wherein the secondary magnetic core comprises a plurality of secondary sub-magnetic cores corresponding to the plurality of magnetic columns, wherein the plurality of secondary sub-magnetic cores are connected at a first side of the upper yoke and the lower yoke.

5. The inductor winding device according to claim 3, wherein the secondary magnetic core comprises a plurality of secondary sub-magnetic cores, wherein the plurality of secondary sub-magnetic cores are arranged between the upper yoke and the lower yoke, and are arranged alternately with the plurality of magnetic columns.

6. The inductor winding device according to claim 3, wherein the secondary magnetic core comprises two secondary sub-magnetic cores, wherein the two secondary sub-magnetic cores are respectively connected to a front side and a back side of the upper yoke and the lower yoke; or the two secondary sub-magnetic cores are respectively connected to a left side and a right side of the upper yoke and the lower yoke; or the two secondary sub-magnetic cores are arranged between the upper yoke and the lower yoke.

7. The inductor winding device according to claim 3, wherein the secondary magnetic core is a cylinder, and both the upper yoke and the lower yoke are cylinders, wherein a diameter of a bottom surface of the secondary magnetic core is smaller than a diameter of a bottom surface of the upper yoke or a diameter of a bottom surface of the lower yoke; and the secondary magnetic core is arranged between the upper yoke and the lower yoke, wherein a center of the bottom surface of the secondary magnetic core coincides with both a center of the bottom surface of the upper yoke and a center of the bottom surface of the lower yoke.

* * * * *